Patented Sept. 8, 1925.

1,552,506

UNITED STATES PATENT OFFICE.

JOHN BURNS READ AND MELVILLE F. COOLBAUGH, OF DENVER, COLORADO.

PROCESS FOR THE EXTRACTION OF CADMIUM AS SULPHATE.

No Drawing. Application filed January 2, 1924. Serial No. 684,086.

*To all whom it may concern:*

Be it known that we, JOHN BURNS READ and MELVILLE F. COOLBAUGH, citizens of the United States, residing at Denver, in the county of Denver and State of Colorado, have invented certain new and useful Improvements in Processes for the Extraction of Cadmium as Sulphate, of which the following is a specification.

The object of this invention is to recover cadmium as sulphate from flue dust and other materials which contain arsenic as well as cadmium, and to free the cadmium from such arsenic and other impurities.

Heretofore two methods have been employed in general for treatment of flue dust to recover cadmium therefrom. The first of these consists in driving off as much of the arsenic as possible by a preliminary roast, and then treating the mass with sulphuric acid followed by roasting at a temperature ranging between 300° C. and 700° C. to form cadmium and other sulphates and to decompose and drive off the excess sulphuric acid. The product is then leached with water to dissolve the cadmium sulphate which is water soluble. But by this procedure a large proportion of the cadmium always remains in the residue united with the arsenic as cadmium arsenate. If this residue be treated with sulphuric acid, much of the cadmium will be taken into solution, but along with it there will also be obtained much of the arsenic in solution which must be separated by difficult methods before the cadmium can be obtained in marketable condition. The second of the two methods consists in dissolving the cadmium and arsenic as completely as possible with sulphuric acid, and then precipitating the arsenic by neutralizing the solution with an alkali in the presence of a ferric salt to obtain ferric arsenate. But the ferric arsenate so precipitated is a bulky colloidal mass which is very difficult to filter and wash, and therefore retains large amounts of the cadmium. This finely colloidal mass is also more or less readily washed through the filter, thereby contaminating the filtrate containing the dissolved cadmium sulphate. Thus, neither of these methods has been satisfactory either as to percentage of recovery or as to manipulation.

In one form of the present process, iron pyrites is added to the flue dust or other cadmium and arsenic bearing materials in quantity somewhat more than equivalent to the arsenic present, and the mixture is roasted at a temperature which may range between 450° C. and 700° C. to produce ferric oxide for the subsequent formation of ferric arsenate, and to drive off as much as possible of the arsenous oxide ($As_2O_3$) as such and also in the form of arsenous sulphide ($As_2S_3$). This initial roast in its early stages is preferably made with only a small quantity of air, which condition is most effective for the elimination of arsenic, but is finished under highly oxidizing conditions with an excess of air to form ferric oxide. Sulphuric acid is then mixed with the roasted materials in quantity somewhat greater than the chemical equivalent of the metal oxides present, and this mass is roasted at a temperature between 300° C. and 700° C. until the major portion or all of the excess sulphuric acid is decomposed and driven off. This treatment results in the formation of lead and cadmium sulphates, the latter being soluble, and causes the remaining arsenic to combine with the ferric iron ($Fe_2O_3$) to form a ferric arsenate in the dry way which is quite granular in nature, is insoluble in water and is filtered easily.

From the insoluble, granular ferric arsenate thus formed, and any lead or other insoluble sulphates present, the soluble cadmium sulphate is readily leached with water, and a very high percentage recovery of the cadmium is obtained.

While the object of the initial roast of the flue dust with the pyrites is for the purpose of eliminating arsenic and ultimately forming ferric oxide ($Fe_2O_3$) there are also formed some cadmium and lead sulphates, and some cadmium and lead arsenates, along with some other sulphates and arsenates. These sulphates permit a corresponding decrease in the amount of sulphuric acid required in the next step for complete conversion of cadmium, lead and other metals to sulphates with the accompanying conversion of all the arsenic into ferric arsenate.

When relatively large amounts of pyrites are used and most of the arsenic driven off, it is possible to form large quantities of cadmium sulphate which can be leached with water, thus eliminating the treatment with sulphuric acid. In order to accomplish the double result, of eliminating arsenic and sulphatizing cadmium with pyrite, the charge can be treated on the top hearth of a superimposed hearth roaster which is sealed from the lower hearths. The temperature on this hearth should be from 450 to 700 degrees centigrade, and only a small quantity of air admitted during the treatment. This will effect a very complete elimination of the arsenic which is taken off in an independent flue. The dust then passes to the lower hearths where more pyrite may be added, where air is admitted, where ferric oxide is formed and where, for most efficient conversion of the cadmium to sulphate, the gases and mineral charge travel in the same direction, or concurrently and are subjected to a temperature that may range between 350° C. and 750° C. The proportion of pyrite to flue dust will vary between wide limits, depending upon the sulphur content of the pyrite and the arsenic and cadmium contents of the flue dust. Mixtures varying from one part pyrite to four parts of dust to one and one-half parts pyrite to one part of dust have proved efficient combinations for different materials used.

For economic reasons, it may be desirable to treat the flue dust in a preliminary roast before addition of the iron pyrites for the purpose of eliminating at this point as much of the arsenious oxide as possible, the temperature for this operation may range between 450° C. and 700° C. The pyrites may then be added and the roast continued to yield ferric oxide as above, this being followed by either a water leach or the sulphuric acid roast. Thus the roast of the dust before and after addition of the pyrites results in the elimination of the greatest amount of arsenious oxide, which is collected in the flue and recovered.

Where ferric oxide may be obtained economically the process may be carried thereon without the use of pyrites. In this instance the flue dust may first be roasted to drive off arsenious oxide, and then mixed with the ferric oxide and roasted. Or either or both of these roasts may be omitted. The ferric oxide and the flue dust are then mixed with sulphuric acid and the roast between 300° C. and 700° C. is carried on as with the other methods with the same results. It will also be possible to use ferric sulphate and other iron compounds, which will be mixed with the flue dust and sulphuric acid and roasted to convert the cadmium and arsenic to cadmium sulphate and ferric arsenate, as above. However, iron pyrites are ordinarily available and much cheaper than the other iron compounds and therefore will be used ordinarily.

In a co-pending application, Serial No. 629,512, filed April 2, 1923, we have disclosed and claimed a process for the extraction of cadmium as sulphate from arsenic and cadmium containing compounds comprising roasting said compounds with iron pyrites to form ferric oxide, mixing sulphuric acid with the roasted materials and roasting the mixture to drive off the excess sulphuric acid and form cadmium sulphate and a ferric arsenate from which the cadmium sulphate may be readily leached.

We claim—

1. The process for the recovery of cadmium as sulphate from arsenic- and cadmium-bearing materials which includes roasting the materials with iron-containing sulphate-forming material to produce cadmium sulphate.

2. The process for the recovery of cadmium as sulphate from arsenic- and cadmium-bearing materials which includes adding iron sulphur containing material to said arsenic- and cadmium-bearing materials, roasting the same to drive off arsenic and convert the cadmium to sulphate.

3. The process for the recovery of cadmium as sulphate from arsenic- and cadmium-bearing materials which includes adding iron sulphur containing material to said arsenic- and cadmium-bearing materials, roasting the same to drive off arsenic and afterwards roasting the resultant products to convert the cadmium to sulphate.

4. The process for the recovery of cadmium as sulphate from arsenic- and cadmium-bearing materials which includes adding iron sulphur containing material to said arsenic- and cadmium-bearing materials, roasting the same in the presence of a small quantity of air to drive off arsenic and then continuing to roast the resultant products in the presence of a greater quantity of air to convert the cadmium to sulphate.

5. The process for the recovery of cadmium as sulphate from arsenic- and cadmium-bearing materials comprising roasting the materials to drive off arsenic, and reroasting the cadmium bearing materials mixed with iron sulphur containing material and effecting thereby the conversion of cadmium to cadmium sulphate.

6. The process for the recovery of cadmium as sulphate from arsenic- and cadmium-bearing materials comprising roasting the materials with a relatively small amount of air to drive off arsenic, and then continuing the roast of the cadmium-bearing materials mixed with iron sulphur containing material and a greater amount of air and effecting thereby the conversion of cadmium to cadmium sulphate.

7. The process for the recovery of cadmium as sulphate from arsenic- and cadmium-bearing materials comprising roasting the material with a relatively small amount of air and at a temperature ranging between 450° and 700° C. to drive off arsenic and reroasting the cadmium-bearing materials mixed with iron sulphur containing material and with a greater amount of air and effecting thereby the conversion of cadmium to cadmium sulphate.

8. The process for the recovery of cadmium as sulphate from arsenic- and cadmium-bearing materials comprising mixing arsenic and cadmium-containing dust with pyrites, roasting the same at a temperature ranging between 450° C. to 700° C. thereby driving off arsenic and afterwards roasting the mixture and thereby converting the cadmium to cadmium sulphate.

In testimony whereof, we affix our signatures.

JOHN BURNS READ.
MELVILLE F. COOLBAUGH.